US006312853B1

(12) United States Patent
Zhang et al.

(10) Patent No.: US 6,312,853 B1
(45) Date of Patent: *Nov. 6, 2001

(54) ELECTROCHEMICAL CELLS WITH CATIONIC POLYMERS AND ELECTROACTIVE SULFUR COMPOUNDS

(75) Inventors: Shengshui Zhang, Gaithersburg, MD (US); Song Cheng, Tucson, AZ (US)

(73) Assignee: Moltech Corporation, Tucson, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/519,062

(22) Filed: Mar. 3, 2000

Related U.S. Application Data

(63) Continuation of application No. 08/994,343, filed on Dec. 19, 1997, now Pat. No. 6,110,619.

(51) Int. Cl.$^7$ ........................................... H01M 4/60
(52) U.S. Cl. ..................... 429/213; 29/623.1; 252/519.34
(58) Field of Search .................................. 429/104, 213; 29/623.1; 252/519.34

(56) References Cited

U.S. PATENT DOCUMENTS

| | | |
|---|---|---|
| 3,288,770 | 11/1966 | Butler . |
| 3,532,543 | 10/1970 | Nole et al. . |
| 3,639,174 | 2/1972 | Kegelman . |
| 3,806,369 | 4/1974 | Dey et al. . |
| 3,830,655 | 8/1974 | Rothwell et al. . |
| 3,907,591 | 9/1975 | Lauck . |
| 3,953,374 | 4/1976 | Windhager . |
| 3,993,503 | 11/1976 | Ludwig . |
| 4,077,930 | 3/1978 | Lim et al. . |
| 4,132,674 | 1/1979 | Hwang .................................. 252/500 |

(List continued on next page.)

FOREIGN PATENT DOCUMENTS

| | | |
|---|---|---|
| 9-147868 | 6/1997 | (JP) . |
| WO 97/44840 | 11/1997 | (WO) . |

OTHER PUBLICATIONS

Chemical Abstracts, Columbus, OH, U.S., Abstract No. 127:97512, "Secondary sulfide batteries with activated carbon fiber cathodes and the activated carbon fibers" corresponding to JP 9–147868 A2, Jun. 1997.

Wpindex Abstract, Derwent Information Ltd., Accession No. 97–356162 [33], "Sulphide secondary battery for effective use of energy—comprises active carbon fiber as anode electrode material" corresponding to JP 9–147868 A, Jun. 1997.

Lewis, R., (ed.), "Quaternary Ammonium Salt", *Hawley's Condensed Chemical Dictionary*, 12$^{th}$ ed., p. 986, Van Nostrand Reinhold Co., New York, 1993, (Month N/A).

Peled, E.; Gorenshtein, A.; Segal, M. and Sternberg, Y., "Rechargeable Lithium–Sulfur Battery (Extended Abstract)", *J. Power Sources*, vol. 26, nos. 3/4, pp. 269–271 (1989), (Month unknown).

Yamin, H. and Peled, E., "Electrochemistry of a Nonaqueous Lithium/Sulfur Cell", *J. Power Sources*, vol. 9, Nos. 3/4, pp. 281–287 (1983). (Month unknown).

(List continued on next page.)

Primary Examiner—Stephen Kalafut
(74) Attorney, Agent, or Firm—Jacqueline M. Nicol; Steven A. Carlson

(57) ABSTRACT

The present invention pertains to solid composite cathodes which comprise (a) an electroactive sulfur-containing cathode material which, in its oxidized state, comprises a polysulfide moiety of the formula, —$S_m$—, wherein m is an integer from 3 to 10; and (b) a cationic polymer comprising quaternary ammonium salt groups. The present invention also pertains to electric current producing cells comprising such solid composite cathodes, and methods of making such solid composite cathodes and electric current producing cells.

23 Claims, 3 Drawing Sheets

U.S. PATENT DOCUMENTS

| | | |
|---|---|---|
| 4,148,639 | 4/1979 | Sinkovitz et al. . |
| 4,171,417 | 10/1979 | Dixon .................... 526/245 |
| 4,222,901 | 9/1980 | Sinkovitz .................... 252/500 |
| 4,237,200 | 12/1980 | Weddingen .................... 429/102 |
| 4,259,411 | 3/1981 | Windhager et al. .................... 28/511 |
| 4,282,118 | 8/1981 | Hwang .................... 252/518 |
| 4,303,748 | 12/1981 | Armand et al. . |
| 4,316,943 | 2/1982 | Sinkovitz et al. .................... 428/475.8 |
| 4,461,787 | 7/1984 | Savit .................... 427/121 |
| 4,501,834 | 2/1985 | Su .................... 524/28 |
| 4,528,111 | 7/1985 | Su .................... 252/107 |
| 4,675,178 | 6/1987 | Klein et al. .................... 424/65 |
| 4,683,179 | 7/1987 | Langpape et al. .................... 429/104 |
| 4,786,364 | 11/1988 | Tefft .................... 162/5 |
| 4,806,410 | 2/1989 | Armington et al. .................... 428/126 |
| 4,833,048 | 5/1989 | De Jonghe et al. .................... 429/104 |
| 4,835,234 | 5/1989 | Valint et al. .................... 526/258 |
| 4,917,974 | 4/1990 | De Jonghe et al. .................... 429/104 |
| 5,162,175 | 11/1992 | Visco et al. . |
| 5,268,407 | 12/1993 | Hayashi et al. .................... 528/398 |
| 5,324,599 | 6/1994 | Oyama et al. .................... 429/213 X |
| 5,348,819 | 9/1994 | Uemachi et al. .................... 429/104 X |
| 5,401,809 | 3/1995 | Gitzel et al. .................... 525/337 |
| 5,441,831 | 8/1995 | Okamoto et al. .................... 429/213 |
| 5,508,343 | 4/1996 | Holley .................... 524/161 |
| 5,516,598 | 5/1996 | Visco et al. .................... 429/42 |
| 5,518,841 | 5/1996 | Sotomura et al. .................... 429/213 |
| 5,523,179 | 6/1996 | Chu .................... 429/104 |
| 5,529,860 | 6/1996 | Skotheim et al. .................... 429/213 |
| 5,532,077 | 7/1996 | Chu .................... 429/102 |
| 5,538,812 | 7/1996 | Lee et al. . |
| 5,582,623 | 12/1996 | Chu .................... 29/623.1 |
| 5,601,947 | 2/1997 | Skotheim et al. .................... 429/213 |
| 5,643,490 | 7/1997 | Takahashi et al. .................... 252/62.2 |
| 5,686,201 | 11/1997 | Chu .................... 429/52 |
| 5,690,702 | 11/1997 | Skotheim et al. .................... 29/623.1 |
| 5,919,587 | 7/1999 | Mukherjee et al. .................... 429/213 |
| 6,072,026 * | 6/2000 | Kawase et al. .................... 429/213 X |
| 6,110,619 * | 8/2000 | Zhang et al. .................... 429/213 |
| 6,117,590 * | 9/2000 | Skothem et al. .................... 429/213 |

OTHER PUBLICATIONS

U.S. Pat. Application Ser. No. 08/602,323, Skotheim et al., "Electroactive High Storage capacity Polyacetyle–Co – Polysulfur Material and Electrlytic Cells Containing Same", filed Feb. 16, 1996.

U.S. Pat. Application Ser. No. 08/995,122, Gorkovenko et al., "Electroactive, Energy–Storing, Highly–Crosslinked, Polysulfide–Containing Organic Polymers for Use in Electrochemical Cell", filed Dec. 19, 1997.

* cited by examiner

ELECTROCHEMICAL CELLS WITH CATIONIC POLYMERS AND ELECTROACTIVE SULFUR COMPOUNDS

RELATED APPLICATION

This application is a continuation of U.S. patent application Ser. No. 08/994,343 filed Dec. 19, 1997, now U.S. Pat. No. 6,110,619 issued Aug. 29, 2000 the content of which is incorporated herein by reference in their entirety.

TECHNICAL FIELD

The present invention relates generally to the field of cathodes and rechargeable electric current producing cells. More particularly, the present invention pertains to solid composite cathodes which comprise (a) an electroactive sulfur-containing material which, in its oxidized state, comprises a polysulfide moiety of the formula, $-S_m-$, wherein m is an integer from 3 to 10; and, (b) a cationic polymer comprising quaternary ammonium salt groups. This cationic polymer improves the electrochemical utilization and cycling efficiency of sulfur-containing electroactive materials when incorporated into the cathode of an electric current producing cell. The present invention also pertains to electric current producing cells comprising such composite cathodes, and to methods of making such solid composite cathodes and electric current producing cells.

BACKGROUND

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

As the rapid evolution of portable electronic devices continues, the need for safe, long lasting, high capacity rechargeable batteries becomes increasingly evident. In recent years, there has been considerable interest in developing high energy density cathode active materials and alkali metals as anode active materials for high energy density lithium secondary batteries to meet these needs.

Lithium and sulfur are highly desirable as the electrochemically active materials for the anode and cathode, respectively, of rechargeable or secondary battery cells because they provide nearly the highest energy density possible on a weight (2500 Wh/kg) or volume (2800 Wh/l) basis of any of the known combinations of materials. To obtain high energy densities, the lithium can be present as the pure metal, in an alloy or in an intercalated form, and the sulfur can be present as elemental sulfur or as a component in an organic or inorganic material with a high sulfur content, preferably greater than 50 weight percent sulfur. Hereinafter, anodes containing the element lithium in any form are referred to as lithium-containing anodes. Cathodes containing the element sulfur in any form are hereinafter referred to as sulfur-containing cathodes.

Many battery systems comprising alkali metal containing anodes and sulfur-containing cathodes have been described. Exemplary of high temperature cells incorporating molten alkali metal anodes and molten sulfur cathodes separated by a solid electrolyte are those described in U.S. Pat. Nos. 3,993,503, 4,237,200, and 4,683,179. For operation, these electric current producing cells must be heated to temperatures greater than about 320° C. Of recent interest are cells comprising alkali metal containing anodes and cathodes containing elemental sulfur that operate at considerably lower temperatures, particularly those with solid cathodes operating at ambient temperatures. Rechargeable lithium sulfur battery cells operating at room temperature have been described by Peled et al. in *J. Power Sources*, 1989, 26, 269–271, wherein the solid sulfur-containing cathodes are comprised of a porous carbon loaded with elemental sulfur. The nature of the porous carbon was not described, but the cells constructed with these cathodes provided only a maximum of 50 cycles. The decline in capacity with cycling was attributed to loss of cathode active material and depletion of the lithium anode.

U.S. Pat. No. 3,639,174 to Kegelman describes solid composite cathodes comprising elemental sulfur and a particulate electrical conductor. U.S. Pat. No. 4,303,748 to Armand et al. discloses solid composite cathodes containing an ionically conductive material together with elemental sulfur, transition metal salts, and other cathode active materials for use with lithium or other anodes in which, for example, the active sulfur or other cathode active material and the inert compounds with electrical conduction, such as graphite powder, are both particles of between 1 and 500 microns in diameter. Further examples of cathodes comprising elemental sulfur, an electrically conductive material, and an ionically conductive material that operate in the temperature range from −40° C. to 145 ° C. are described in U.S. Pat. Nos. 5,523,179, 5,532,077, 5,582,623 and 5,686,201 to Chu.

In spite of the many known systems, as for example described above, solid composite cathodes comprising elemental sulfur in rechargeable alkali metal sulfur battery systems have been problematic in obtaining good electrochemical efficiency, utilization, and capacity, cycle life, and safety of the cells owing to the diffusion of sulfur-containing active materials from the sulfur-containing cathode into the electrolyte and other components of the electric current producing cells. This has been particularly true in battery cells comprising a sulfur-containing cathode in combination with a lithium-containing anode. U.S. Pat. No. 3,907,591 to Lauck and an article by Yamin et al. in *J. Power Sources*, 1983, 9, 281–287 describe the reduction of elemental sulfur during the discharging of a lithium/sulfur cell to soluble polysulfides in high concentrations in the electrolyte. Even partial reduction of the solid sulfur in the cathode forms polysulfides, such as lithium octasulfide, that are soluble in organic electrolytes. In battery cells, these soluble polysulfides diffuse from the cathode into the surrounding electrolyte and may react with the lithium anode leading to its fast depletion. This results in reduced electrochemical efficiency, utilization, and capacity of the battery cell.

In attempts to reduce the problems associated with the generation of soluble polysulfides in alkali metal battery cells comprising elemental sulfur, electric current producing cells have been developed utilizing cathodes comprised of sulfur-containing materials in which sulfur is chemically bound to an organic or carbon polymer backbone or to a low molecular weight organic compound. One such class of electroactive sulfur-containing materials has been referred to as organo-sulfur materials. Herein, the term "organo-sulfur materials" means a material containing organic sulfur compounds with only single or double carbon-sulfur bonds or sulfur-sulfur bonds forming disulfide linkages.

U.S. Pat. Nos. 4,833,048 and 4,917,974 to Dejonghe et al. disclose liquid sulfur-containing cathodes comprising organo-sulfur materials of the formula, $(R(S)_y)_n$, where y=1 to 6; R is one or more different aliphatic or aromatic organic moieties having 1 to 20 carbon atoms; and n is greater than 1. U.S. Pat. No. 5,162,175 to Visco et al. describes the use of 1 to 20 weight percent of conductor particles, such as carbon black, in solid composite cathodes containing organo-sulfur materials having disulfide electroactive groups. These organo-sulfur materials undergo polymerization (dimerization) and de-polymerization (disulfide cleavage) upon the formation and breaking of the disulfide bonds. The de-polymerization which occurs during the discharging of the cell results in lower molecular weight polymeric and monomeric species, which may dissolve into the electrolyte and cause self-discharge, reduced capacity, and eventually complete cell failure, thereby severely reducing the utility of organo-sulfur materials as a cathode-active material in secondary batteries. Although the soluble discharge products are typically soluble organic sulfides rather than the inorganic polysulfides of the type formed with elemental sulfur, the detrimental effects on electrochemical efficiency and cycle life are similar. In addition, the organo-sulfur materials typically contain less than 50 weight percent of sulfur and have only electroactive disulfide (—S—S—) bonds so they have a much lower energy density or specific capacity than elemental sulfur.

U.S. Pat. No. 5,324,599 to Oyama et al. discloses a solid composite cathode comprising a combination of a compound having a disulfide group and a conductive polymer, or an organo-disulfide derivative of a conductive polymer. In one variation, a complex is formed from a disulfide compound and a conductive polymer in a composite cathode layer so that the disulfide compound is not likely to leak out of the composite cathode into the electrolyte of the rechargeable battery.

In a similar approach to overcome the dissolution problem with organo-sulfur materials, U.S. Pat. No. 5,516,598 to Visco et al. discloses solid composite cathodes comprising metal/organo-sulfur charge transfer materials with one or more metal-sulfur bonds, wherein the oxidation state of the metal is changed in charging and discharging the positive electrode or cathode. The metal ion provides high electrical conductivity to the cathode, although it significantly lowers the cathode energy density and capacity per unit weight of the polymeric organo-sulfur material. There is no mention of retarding the transport of soluble reduced sulfide or thiolate anion species formed during charging or discharging of the cell.

Another class of electroactive sulfur-containing materials comprises carbon-sulfur polymer materials, for example, as described in U.S. Pat. Nos. 5,601,947, 5,609,702 and 5,529, 860, and in copending U.S. patent application Ser. No. 08/602,323, to Skotheim et al. Herein, the term "carbon-sulfur polymer materials" means materials comprising carbon-sulfur polymers with carbon-sulfur single bonds and with sulfur-sulfur bonds comprising trisulfide, tetrasulfide, or higher polysulfide linkages. The carbon-sulfur polymer materials comprise, in their oxidized state, a polysulfide moiety of the formula, $-S_m-$, wherein m is an integer equal to 3 or greater.

Several approaches have been described to inhibit or retard the transport or diffusion of soluble polysulfides from the cathode to the electrolyte. U.S. Pat. No. 3,806,369 to Dey et al. describes an ion exchange membrane between the cathode and the electrolyte/separator layer to inhibit the passage of polysulfides or other anions from the cathode into the electrolyte. Without this barrier layer, the soluble polysulfides or other anions are reported to form insoluble films on the cathode and to shorten the cycle life of the cell. U.S. Pat. No. 3,532,543 to Nole et al. describes the attempt to use copper halide salts to limit the formation of polysulfides in a solid composite cathode containing elemental sulfur. U.S. patent application Ser. No. 08/859,996 to the common assignee, titled "Novel Composite Cathodes, Electrochemical Cells Comprising Novel Composite Cathodes, and Processes for Fabricating Same", discloses the addition of a class of electroactive transition metal chalcogenide materials to sulfur-containing cathodes to encapsulate or entrap the sulfur-containing materials to retard the transport of soluble polysulfides and sulfides from the cathode into the electrolyte.

Japan patent publication No. 09-147868, published Jun. 6, 1997, describes the use of active carbon fibers to absorb electroactive sulfur-containing materials in cathodes of secondary batteries and to provide increased cycle life at high discharge currents. These active carbon fibers are characterized by highly microporous structures which absorb large amounts of sulfur-containing materials into the pores.

Despite the various approaches proposed for the fabrication of high energy density rechargeable cells comprising elemental sulfur, organo-sulfur or carbon-sulfur polymer materials in a solid composite cathode, there remains a need for materials and cell designs that prevent the excessive out-diffusion of sulfides and polysulfides from the cathode layers in these cells and improve the electrochemical efficiency and utilization of the cathode active materials.

SUMMARY OF THE INVENTION

One aspect of the present invention pertains to a solid composite cathode for use in an electric current producing cell comprising (a) an electroactive sulfur-containing cathode material, which material, in its oxidized state, comprises a polysulfide moiety of the formula, $-S_m-$, wherein m is an integer from 3 to 10, and (b) a cationic polymer comprising quaternary ammonium salt groups.

In one embodiment of the cathode of the present invention, the cationic polymer comprising quaternary ammonium salt groups is selected from the group consisting of: poly(diallyldimethylammonium) salts, copolymer salts of diallyldimethylammonium and acrylamide, copolymer salts of diallyldimethylammonium and diacetone acrylamide, copolymer salts of diallyldimethylammonium and N-methylolacrylamide, polyvinyl benzyl trimethyl ammonium salts, salts of polyepichlorohydrin quaternized with trimethyl amine, poly(dimethyl propyl ammonium) salts, polymethacryloyloxyethyl trimethyl ammonium salts, and polymethacryloyloxyethyl dimethyl hydroxyethyl ammonium salts. In a preferred embodiment, the cationic polymer comprising quarternary ammonium salt groups is a poly(diallyldimethylammonium) salt. In a most preferred embodiment, the cationic polymer comprising quaternary ammonium salt groups is a copolymer salt of diallyldimethyl ammonium and acrylamide.

In one embodiment of the cathode of the present invention, the negatively charged acid salt or anion in the quaternary ammonium salt groups of the cationic polymer is a monovalent anion. In one embodiment, the negatively charged acid salt is selected from the group consisting of: $BF_4^-$, $B(phenyl)_4^-$, $CF_3SO_3^-$; $(CF_3SO_2)_2N^-$, $PF_6^-$, $AsF_6^-$, $ClO_4^-$, $CH_3SO_3^-$,

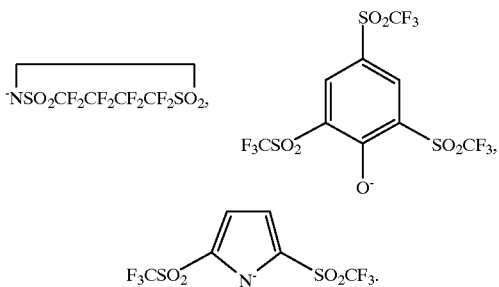

In a preferred embodiment, the negatively charged acid salt is selected from the group consisting of: $BF_4^-$, $CF_3SO_3^-$, $(CF_3SO_2)_2N^-$, and $Cl^-$.

The solid composite cathodes of the present invention comprise an electroactive sulfur-containing material, which material, in its oxidized state, comprises a polysulfide moiety of the formula, $-S_m-$, wherein m is an integer from 3 to 10. In one embodiment, m is an integer from 3 to 6. In one embodiment, m is an integer from 3 to 8. In a preferred embodiment, m is an integer from 6 to 10. In one embodiment, the polysulfide linkage comprises —S—S—S—(i.e., trisulfide). In one embodiment, the polysulfide linkage comprises —S—S—S—S—(i.e., tetrasulfide). In one embodiment, the polysulfide linkage comprises —S—S—S—S—S—(i.e., pentasulfide). In one embodiment, the polysulfide linkage comprises —S—S—S—S—S—S—(ie.,hexasulfide). In one embodiment, the polysulfide linkage comprises —S—S—S—S—S—S—S—(i.e., heptasulfide). In one embodiment the polysulfide linkage comprises —S—S—S—S—S—S—S—S—(i.e., octasulfide).

In one embodiment, the electroactive sulfur-containing material of the solid composite cathodes of the present invention comprises elemental sulfur. In one embodiment, the electroactive sulfur-containing material comprises a carbon-sulfur polymer. In one embodiment, the polysulfide moiety, $-S_m-$, of the carbon-sulfur polymer is covalently bonded by one or both of its terminal sulfur atoms on a side group to the polymer backbone chain of the carbon-sulfur polymer. In one embodiment, the polysulfide moiety, $-S_m-$, of the carbon-sulfur polymer is incorporated by covalent bonds to both of its terminal sulfur atoms into the polymer backbone chain of the carbon-sulfur polymer. In one embodiment, the carbon-sulfur polymer comprises greater than 75 weight percent of sulfur.

In one embodiment, the solid composite cathodes of the present invention further comprise a non-cationic polymeric binder. In one embodiment, the non-cationic polymeric binder comprises a non-cationic polymeric binder selected from the group consisting of: polyethylene oxides, polypropylene oxides, polyethers, polyimides, polyphosphazenes, polyacrylonitriles, cellulosics, polyvinyl alcohols, polyvinyl acetates, polyvinyl butyrals and urethanes. In a preferred embodiment, the non-cationic polymeric binder comprises polyethylene oxide. In a preferred embodiment, the non-cationic polymeric binder comprises hydroxyethyl cellulose. In one embodiment, the weight ratio of said non-cationic polymeric binder to cationic polymer binder is in the range of 0.25:1 to 1:1.

In one embodiment, the solid composite cathodes of the present invention further comprise one or more conductive fillers selected from the group consisting of: conductive carbons, graphites, active carbon fibers, metal flakes, metal powders, metal fibers, electrically conductive polymers, and electrically conductive metal chalcogenides.

In one embodiment, the solid composite cathodes of the present invention further comprise an electrolyte.

In one embodiment, the solid composite cathodes of this invention further comprise a non-electroactive metal oxide selected from the group consisting of: silicas, aluminum oxides, silicates, and titanium oxides.

Another aspect of the present invention pertains to electric current producing cells which comprise an anode; a solid composite cathode of the present invention, as described herein; and an electrolyte interposed between the anode and the cathode.

Examples of suitable anodes for use in the cells of the present invention include, but are not limited to, lithium metal, lithium-aluminum alloys, lithium-tin alloys, lithium intercalated carbons, and lithium intercalated graphites.

Examples of suitable electrolytes for use in cells of the present invention include, but are not limited to, liquid electrolytes, gel polymer electrolytes, and solid polymer electrolytes.

In a preferred embodiment, the electrolyte comprises one or more ionic electrolyte salts and one or more polymers selected from the group consisting of: polyethers, polyethylene oxides, polypropylene oxides, polyimides, polyphosphazenes, polyacrylonitriles, polysiloxanes, polyether grafted polysiloxanes; derivatives of the foregoing; copolymers of the foregoing; and blends of the foregoing.

In a preferred embodiment, the electrolyte for the cell of this invention comprises one or more ionic electrolyte salts and one or more electrolyte solvents selected from the group consisting of: N-methyl acetamide, acetonitrile, carbonates, sulfolanes, sulfones, N-alkyl pyrrolidones, dioxolanes, glymes, and siloxanes.

Yet another aspect of the present invention pertains to methods of manufacturing a solid composite cathode, as described herein.

Still another aspect of the present invention pertains to methods of manufacturing an electric current producing cell which employs a solid composite cathode, as described herein.

As one of skill in the art will appreciate, features of one embodiment and aspect of the invention are applicable to other embodiments and aspects of the invention.

DETAILED DESCRIPTION OF THE INVENTION

Figure 1:
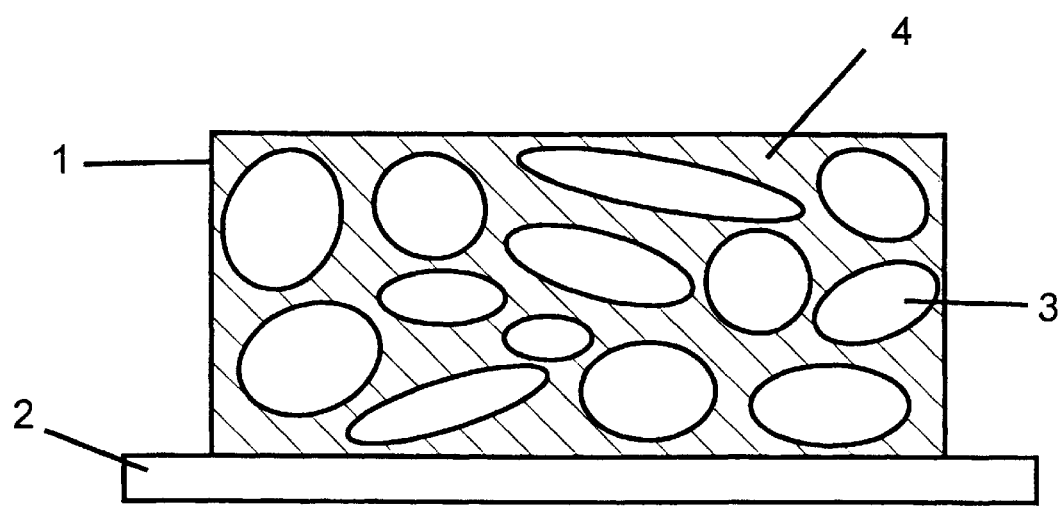
FIG. 1 shows a solid composite cathode configuration on a current collector wherein the cationic polymer comprising quaternary ammonium salt groups remains as an interface layer at the boundaries of the electroactive sulfur-containing cathode materials. The composite cathode may be represented as a composite having the electroactive sulfur-containing cathode materials dispersed in a matrix comprising the cationic polymer comprising quaternary ammonium salt groups in a matrix composition which optionally contains non-cationic polymeric binder materials, conductive fillers, and other additives.

One aspect of the present invention pertains to a solid composite cathode for use in an electric current producing cell comprising (a) an electroactive sulfur-containing cathode material, which material, in its oxidized state, comprises a polysulfide moiety of the formula, $-S_m-$, wherein m is an integer from 3 to 10, and (b) a cationic polymer comprising quaternary ammonium salt groups. The solid composite cathodes of the present invention are particularly preferred for use in electrolytic cells, rechargeable batteries, fuel cells, and the like, which comprise electroactive sulfur-containing cathodes and which require high energy density.

Cationic Polymers with Quaternary Ammonium Salt Groups

The term "quaternary ammonium salt groups," as used herein, means organic nitrogen functional groups that include a central nitrogen atom joined to four organic groups (the cation) and a negatively charged acid salt (the anion), as for example described in *Hawleys's Condensed Chemical Dictionary*, 12th Edition, page 986, (1993), by Lewis.

A variety of polymeric binders have been utilized in the solid composite cathodes of electric current producing cells, including those based on sulfur-containing cathodes. These polymeric binders fall generally into three types: (1) polymer electrolyte polymers; (2) electronically conductive polymers; and (3) non-ionically and non-electronically conductive polymers, herein referred to as inert "binders."

Some desirable properties for these polymeric binders include, but are not limited to, providing mechanical strength to the solid composite cathode, providing increased electrochemical utilization, efficiency, and capacity in the cycling of the electroactive cathode material, and inertness to chemical reaction with the electroactive cathode material and other components of the cell that may contact the polymeric binder. With sulfur-containing cathodes where excessive out-diffusion of soluble polysulfides reduces the electrochemical utilization, efficiency, and capacity during cycling of the cells, it would be highly desirable to utilize a polymeric binder which would retard the out-diffusion of soluble polysulfides and retain more of the polysulfides in the solid composite cathode.

Examples of polymer electrolyte polymers used in sulfur-containing solid composite cathodes include polyethylene oxides, polypropylene oxides, polyacrylonitriles, polysiloxanes, polyimides, polyethers, sulfonated polyimides, divinyl polyethylene glycols, polyethylene glycol-bis(methyl acrylates), polyethylene glycol-bis (methyl methacrylates), polyphosphazenes, and polyether grafted polysiloxanes, as for example described in U.S. Pat. No. 4,303,748 to Armand et al.; in U.S. Pat. Nos. 5,529,869, 5,601,947, and 5,690,702 to Skotheim et al.; and, in U.S. Pat. Nos. 5,523,179, 5,532,077, 5,582,623, and 5,686,201 to Chu. These polymer electrolyte polymers have ionically conductive properties which may improve the electrochemical utilization, efficiency, and capacity upon cycling of the cell.

Examples of electronically conductive polymers used in sulfur-containing solid composite cathodes include polyanilines, polyacetylenes, polypyrroles, polythiophenes, polyphenylene-vinylenes, polythienylene-vinylenes, and polyphenylenes, as for example described in U.S. Pat. Nos. 5,529,869, 5,601,947, and 5.690,702 to Skotheim et al.; and in U.S. Pat. Nos. 5,523,179, 5,532,077, 5,582,623, and 5,686,201 to Chu. These electronically conductive polymers provide electrical conductivity to the solid composite cathodes and may have electrocatalytic properties to improve the electrochemical utilization, efficiency, and capacity of the cell.

Examples of inert binders used in sulfur-containing solid composite cathodes include polytetrafluoroethylenes and other fluorinated polymers, styrene butadiene rubbers, and ethylene-propylene-diene (EPDM) rubbers, as for example described in U.S. Pat. Nos. 5,529,869, 5,601,947, and 5,690, 702 to Skotheim et al.; These inert binders typically provide mechanical strength and improved cohesion and adhesion to the solid composite cathode layer.

The polymer electrolyte polymers, electronically conductive polymers, and inert binders known in the art for use with sulfur-containing solid composite cathodes are non-ionic or anionic polymers. Heretofore there has been no disclosure of the use of cationic polymers in a solid composite cathode of electroactive sulfur-containing cathode materials for use in electric current producing cells.

Since soluble polysulfides, such as lithium octasulfide, are dianions and other soluble polysulfide reduction products of electroactive sulfur-containing cathodes may be polyanions with three or more anionic groups, the cationic polymers of the present invention form complexes with the anion groups of polysulfides and retard the excessive out-diffusion of soluble polysulfides from the solid composite cathode. The dianion and polyanion natures of the polysulfides makes these complexes typically stronger and more resistant to breaking or solubilization than would exist with a similar complex of quaternary ammonium groups to monoanions.

The cationic polymers of the solid composite cathodes of the present invention comprise those cationic polymers having quaternary ammonium salt groups. These polymers include those wherein the quaternary ammonium salt group is present as a pendant group to the main polymer backbone chain, such as for example, polyvinyl benzyl trimethyl ammonium salts and poly(methacryloyloxyethyl trimethyl ammonium) salts. Also useful are those polymers wherein the quaternary ammonium salt group is incorporated into the main polymer backbone chain, such as, for example, poly (diallyldimethylammonium) salts and copolymer salts of diallyldimethylammonium and acrylamide.

Cationic polymers comprising quaternary ammonium salt groups are well known materials that have found a variety of uses. For example, the use of cationic polymers comprising quaternary ammonium salt groups in electrically conductive coatings, papers, and plastic films is described in U.S. Pat. No. 3,830,655 to Rothwell et al.; U.S. Pat. No. 3,953,374 to Windhager; U.S. Pat. No. 4,132,674 to Hwang; U.S. Pat. No. 4,148,639 to Sinkowitz et al.; U.S. Pat. No. 4,171,417 to Dixon; U.S. Pat. No. 4,222,901 to Sinkovitz; U.S. Pat. No. 4,259,411 to Windhager et al.; U.S. Pat. No. 4,282,118 to Hwang; U.S. Pat. No. 4,316,943 to Sinkovitz et al.; U.S. Pat. No. 4,461,787 to Savit; U.S. Pat. No. 4,806,410 to Armington et al.; U.S. Pat. No. 5,268,407 to Hayashi et al.; and U.S. Pat. No. 5,508,343 to Holley. Other applications for cationic polymers comprising quaternary ammonium salt groups include self-inverting emulsion polymers as described in U.S. Pat. No. 4,077,930 to Lim et al.; waste water cleanup as described in U.S. Pat. No. 4,835,234 to Valint et al.; deinking cellulosic fibrous material as described in U.S. Pat. No. 4,786,364 to Tefft; deodorant compositions as described in U.S. Pat. No. 4,675,178 to Klein et al.; and shaving cream gels as described in U.S. Pat. Nos. 4,501,834 and 4,528,111 to Su. U.S. Pat. No. 5,643,490 to Takahashi et al.; describes the use of an organic polymer having an alkyl quaternary ammonium salt structure in solid polymer electrolyte compositions. The synthesis and structures of cationic polymers comprising quaternary ammonium salt groups are described in U.S. Pat. No. 3,288,770 to Butler and U.S. Pat. No. 5,401,809 to Gitzel et al., as well as described in the patents on applications of these cationic polymers as referenced heretofore. There has been no disclosure of the use of cationic polymers comprising quaternary ammonium salt groups in a solid composite cathode of electroactive sulfur-containing cathode materials for use in electric current producing cells.

Suitable cationic polymers comprising quaternary ammonium salt groups for use in the solid composite cathodes of the present invention include, but are not limited to, poly (diallyldimethylammonium) salts, copolymer salts of diallyldimethylammonium and acrylamide, copolymer salts of diallyldimethylammonium and diacetone acrylamide, copolymer salts of diallyldimethylammonium and N-methyloylacrylamide, polyvinyl benzyl trimethyl ammonium salts, salts of polyepichlorohydrin quaternized with trimethylamine, poly(dimethyl propyl ammonium) salts, polymethacryloyloxyethyl trimethyl ammonium salts, and polymethacryloyloxyethyl dimethyl hydroxyethyl ammonium salts. A preferred cationic polymer of this invention is a poly(diallyldimethyl ammonium) salt. A particularly preferred cationic polymer of the present invention is a copolymer salt of diallydimethyl ammonium and acrylamide.

With each cationic quaternary ammonium group of the polymers of this invention, there is associated a negatively charged acid salt or anion. This anion may be any anion which does not have a detrimental reaction with the electroactive cathode material or other materials of the cell that the anion may contact. Monovalent anions are preferred because multivalent anions in the cationic polymer during processing to form the solid composite cathode tend to interfere with the solubility and uniformity of the polymer in the coating mixture. Particularly preferred anions are those anions which are known in the art for use with lithium salts as the ionic electrolyte salts in organic electrolytes for use in electric current producing cells. Most particularly preferred anions for the cationic polymers of the electric current producing cells of this invention are those anions which are present in the ionic electrolyte salt of the electrolyte of these cells. Suitable negatively charged acid salts or anions for the cationic polymers of the present invention include, but are not limited to, $BF_4^-$, $B(phenyl)_4^-$, $CF_3SO_3^-$(triflate), $(CF_3SO_2)_2N^-$(imide), $PF_6^-$; $AsF_6^-$, $ClO_4^-$, $CH_3SO_3^-$,

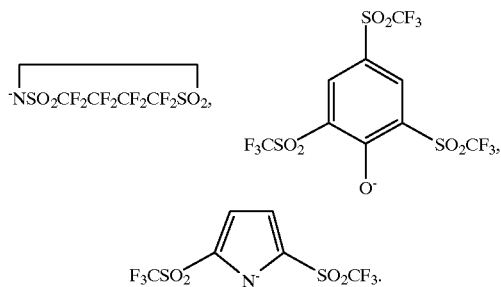

Also suitable anions for the cationic polymers of the present invention are borates, as described in U.S. Pat. No. 5,401,809 to Gitzel et al.; Most particularly preferred negatively charged acid salts or anions for this invention are $BF_4^-$, $CF_3SO_3^-$, $(CF_3SO_2)_2N^-$, and $Cl^-$.

Electroactive Sulfur-Containing Cathode Materials

One aspect of the present invention pertains to a solid composite cathode for use in an electric current producing cell comprising (a) an electroactive sulfur-containing cathode material, which material, in its oxidized state, comprises a polysulfide moiety of the formula, $—S_m—$, wherein m is an integer from 3 to 10, and (b) a cationic polymer comprising quaternary ammonium salt groups, as described herein.

The term "electroactive," as used herein, pertains to the electrochemical property of a material which takes part in the electrochemical reaction of charge or discharge in an electric current producing cell. The term "non-electroactive," as used herein, pertains to the electrochemical property of a material which does not take part in the electrochemical reaction of charge or discharge in an electric current producing cell.

The term "sulfur-containing cathode material," as used herein, relates to cathode active materials which comprise the element sulfur in any form, wherein the electrochemical activity involves the breaking or forming of sulfur-sulfur covalent bonds.

In one embodiment, the electroactive sulfur-containing cathode material comprises elemental sulfur.

In one embodiment, the electroactive sulfur-containing cathode material is organic, that is, it comprises both sulfur atoms and carbon atoms.

In one embodiment, the electroactive sulfur-containing cathode material is polymeric. In one embodiment, the polymeric electrocactive sulfur-containing cathode material comprises a carbon-sulfur polymer, and the polysulfide moiety, $—S_m—$, is covalently bonded by one or both of its terminal sulfur atoms on a side group to the polymer backbone chain of said carbon-sulfur polymer material. In one embodiment, the polymeric electroactive sulfur-containing cathode material comprises a carbon-sulfur polymer, and the polysulfide moiety, $—S_m—$, is incorporated into the polymer backbone chain of said carbon-sulfur polymer by covalent bonding of said polysulfide moiety's terminal sulfur atoms.

The nature of the electroactive sulfur-containing cathode materials useful in the practice of this invention may vary widely. The electroactive properties of elemental sulfur and of sulfur-containing materials are well known in the art, and include the reversible formation of lithiated or lithium ion sulfides during the discharge or cathode reduction cycle of the battery cell.

Examples of polymeric electroactive sulfur-containing materials include, but are not limited to, those comprising one or more carbon-sulfur compounds of formulae $(CS_x)_n$ and $(C_2S_x)_n$. Compositions of the general formula $(CS_x)_n$ (formula I), wherein x ranges from 1.2 to 2.3, and n is an integer equal to or greater than 2, are described in U.S. Pat. No. 5,441,831 to Okamoto et al. Additional examples include those wherein x ranges from greater than 2.3 to about 50, and n is equal to or greater than 2, as described in U.S. Pat. Nos. 5,601,947 and 5,690,702 to Skotheim et al.

Further examples of polymeric electroactive sulfur-containing materials are those of the general formula $—(C_2S_z)_n—$ (formula II) wherein z ranges from greater than 1 to about 100, and n is equal to or greater than 2, as described in U.S. Pat. No. 5,529,860 and copending U.S. patent application Ser. No. 08/602,323 to Skotheim et al.

The preferred materials of general formulae I and II, in their oxidized state, comprise a polysulfide moiety of the formula, $—S_m—$, wherein m is an integer equal to or greater than 3, or more preferably, wherein m is an integer from 3 to 10. In one embodiment, m is an integer from 3 to 6. In one embodiment, m is an integer from 3 to 8. In one embodiment, m is an integer from 6 to 10. In one embodiment, the polysulfide linkage comprises —S—S—S—(i.e., trisulfide). In one embodiment, the polysulfide linkage comprises —S—S—S—S—(i.e., tetrasulfide). In one embodiment, the polysulfide linkage comprises —S—S—S—S—S—(i.e., pentasulfide). In one embodiment, the polysulfide linkage comprises —S—S—S—S—S—S—(ie., hexasulfide). In one embodiment, the polysulfide linkage comprises —S—S—S—S—S—S—S—(i.e., heptasulfie). In one embodiment, the polysulfide linkage comprises S—S—S—S—S—S—S—S—(i.e., octasulfide).

The backbone of polymeric electroactive sulfur-containing materials may comprise —$S_m$—main chain linkages as well as covalently bound —$S_m$—side groups. Owing to the presence of multiple linked sulfur atoms, —$S_m$—, where m is an integer equal to or greater than 3, in these materials, they possess significantly higher energy densities or specific capacities than corresponding materials containing the disulfide linkage, —S—S—, alone.

Other preferred polymeric electroactive sulfur-containing materials are those comprising carbocyclic repeat groups, as described in copending U.S. patent application titled, "Electroactive, Energy-Storing, Highly-Crosslinked, Polysulfide-Containing Organic Polymers for Use in Electrochemical Cells," filed on even date herewith.

Polymeric electroactive sulfur-containing materials of the present invention typically have elemental compositions containing between about 50 weight per cent and 98 weight percent sulfur. Preferred polymeric electroactive sulfur-containing materials have greater than 75 weight percent sulfur. Particularly preferred polymeric electroactive sulfur-containing materials have greater than 86 weight percent sulfur, and most particularly preferred are polymeric electroactive sulfur-containing materials with greater than 90 weight percent sulfur.

With carbon-sulfur polymer materials in solid composite cathodes, polysulfides are formed during discharge. The term "polysulfides," as used herein means sulfur-containing materials with two or more S⁻ groups present. The disulfides of organo-sulfur materials form polysulfides (RS⁻, where R is the organo-sulfur moiety to which two or more S⁻ or sulfide groups are attached) during reduction or discharge. Since the carbon-sulfur polymer materials contain large amounts of (—$S_m$—) groups where m is an integer from 3 to 10, they form organic polysulfides of the general formula (R'$S_x^-$) during reduction or discharge, where x is 2 or greater and R' is the carbon-sulfur moiety to which the polysulfide group is attached. These polysulfides are typically insoluble because of their attachment to the polymer backbone, but upon continued discharge, they are further reduced to form some soluble organic polysulfides and inorganic polysulfides of the formula ($S_x^{2-}$), where x is 2 or greater.

Even though the carbon-sulfur polymer materials show improvements over organo-sulfur materials as cathode active materials because of lower amounts of soluble sulfides and because of much higher specific capacities from the multiple polysulfide linkages and the typically higher weight percent of sulfur (of over 50 percent, and often above 85 percent of sulfur by weight), there is typically still some formation of soluble organic polysulfides and inorganic polysulfides during the electrochemical cycling of carbon-sulfur polymer materials. The cationic polymers comprising quaternary ammonium salt groups of the present invention have a strong complexation of soluble polysulfides and retard their out-diffusion from the solid composite cathode and thereby enhance their availability during charging to regenerate a carbon-sulfur polymer material and to improve the reversible capacity and charging efficiency properties.

Solid Composite Cathodes

One aspect of the present invention pertains to solid composite cathodes for use in an electric current producing cell, which composite cathodes comprise (a) an electroactive sulfur-containing cathode material, which material, in its oxidized state, comprises a polysulfide moiety of the formula, —$S_m$—, wherein m is an integer from 3 to 10, and (b) a cationic polymer comprising quaternary ammonium salt groups, as described herein.

In one embodiment, the solid composite cathode is fabricated from a mixture comprising the electroactive sulfur-containing cathode material and the cationic polymer comprising quaternary ammonium salt groups, which mixture is deposited onto a substrate. Optionally, the mixture may further comprise conductive additives, non-cationic polymeric binders, electrolytes, and other additives to further improve the electrochemical recyclability and capacity of the cells.

In one embodiment, the solid composite cathodes of this invention further comprise a non-electroactive metal oxide which is added to the cathode coating layer to further improve the access to the electrolyte during the filling process and during the cycling of the cell. This is especially beneficial in increasing the energy density and capacity above that achieved with only the electroactive sulfur-containing material (e.g., elemental sulfur and carbon-sulfur polymer materials) and the cationic polymer comprising quaternary ammonium salt groups of the present invention. Examples of these non-electroactive metal oxides include, but are not limited to, silicas, aluminum oxides, silicates, and titanium oxides.

The relative amounts of electroactive sulfur-containing material, cationic polymer comprising quaternary ammonium salt groups, and optional components such as conductive additives, non-cationic polymeric binders, electrolytes, non-electroactive metal oxides, other additives, and current collector in the solid composite cathode may vary widely. Generally these relative amounts are determined by experimentation and chosen so as to optimize the amount of electroactive cathode material present, the energy storage capacity of the cathode, and the electrochemical performance of the solid composite cathode in an electric current producing cell. Typically, the amount of electroactive sulfur-containing material used in the solid composite cathode of the present invention will vary from about 50 weight percent to 96 weight percent. Preferred are solid composite cathodes comprising between 60 weight percent and 96 weight percent sulfur-containing material. Especially preferred are those containing greater than 80 weight percent sulfur-containing material.

The relative amounts of sulfur-containing cathode active material and cationic polymer comprising quaternary ammonium salt groups in the solid composite cathode may vary widely so long as sufficient cationic polymer is present to effectively provide complexation to retard the out diffusion of soluble polysulfides for efficient electrochemical utilization and cycling of the sulfur-containing cathode active material consistent with the volumetric density requirements for loading of cathode active material in the cell. Typically, the amount of cationic polymer comprising quaternary ammonium salt groups used in the solid composite cathodes will vary from about 1 weight percent to about 25 weight percent of the weight of sulfur-containing cathode active material in the cathode coating layer. Preferred solid composite cathodes are those which comprise between 2 weight percent and 15 weight percent of cationic polymer comprising quaternary ammonium salt groups based on the weight of sulfur-containing cathode active material. Most preferred solid composite cathodes comprise between 4 weight percent and 10 weight percent of cationic polymer comprising quaternary ammonium salt groups based on the weight of the sulfur-containing cathode active material.

The solid composite cathodes of the present invention may further comprise one or more materials selected from the group of conductive additives, non-cationic polymeric binders, and electrolytes, usually to improve or simplify their fabrication as well as improve their electrical and electrochemical characteristics.

Useful conductive additives are those conductive materials that provide electrical connectivity to the majority of the electroactive materials in the solid composite cathode. Examples of useful conductive additives include, but are not limited to, conductive carbons, (e.g., carbon blacks), graphites, active carbon fibers, metal flakes, metal powders, metal fibers, electrically conductive polymers, and electrically conductive metal chalcogenides.

Further useful conductive additives in the composite cathode of the present invention are non-activated carbon nanofibers, as described in present applicant's copending U.S. Pat. Application titled "Electrochemical Cells with Carbon Nanofibers and Electroactive Sulfur Compounds", filed of even date herewith.

The choice of non-cationic polymeric binder material may vary greatly so long as it is inert with respect to the solid composite cathode active materials and is compatible with the cationic polymers of the present invention. Useful non-cationic binders are those materials that allow for ease of processing of battery electrode composites and are generally known to those skilled in the art of electrode fabrication. Examples of useful non-cationic binders include, but are not limited to, organic polymers such as polytetrafluoroethylenes, polyvinylidene fluorides, ethylene-propylene-diene (EPDM) rubbers, styrene butadiene rubbers, polyethylene oxides (PEO), polypropylene oxides, cellulosics, polyvinyl alcohols, polyvinyl acetates, polyvinyl butyrals, urethanes, polyacrylonitriles, polysiloxanes, polyimides, sulfonated polyimides, polyphosphazenes, UV curable acrylates, UV curable methacrylates, and heat curable divinyl ethers. Preferred non-cationic polymeric binders are polyethylene oxides and hydroxyethyl cellulose.

Examples of useful electrolytes in the solid composite cathodes of this invention include, but are not limited to, liquid, solid, or solid-like materials capable of storing and transporting ions, so long as the electrolyte material is stable electrochemically and chemically with respect to the cathode and facilitates the transport of ions between the anode and the cathode.

In those cases where non-cationic binder and conductive additive are desired, the amounts of non-cationic polymeric binder and conductive additive may vary widely, and the amounts present will depend on the desired performance. Typically, when non-cationic polymeric binders and conductive additives are used, the amount of non-cationic polymeric binder will vary greatly, but will generally be less than about 12 weight percent of the solid composite cathode. Preferred amounts are less than 6 weight percent. The amount of conductive additive used will also vary greatly and will typically be less than 15 weight percent of the solid composite cathode. Preferred amounts of conductive additives are less than 12 weight percent. Where the cationic polymer of the present invention has electronically conductive properties and is present in the solid composite cathode, the amounts of conductive additives may be zero or considerably reduced from their typical levels.

The solid composite cathodes of the present invention may also contain current collectors. Suitable current collectors for use in the present invention are those known in the art for solid electroactive sulfur-containing cathodes. Examples of suitable current collectors include, but are not limited to, metal films, foils, nets, and expanded metal grids made from metals such as, for example, nickel, titanium, aluminum, tin, and stainless steel, and plastic films with conductive layers comprising metals such as, for example, aluminum, stainless steel, nickel, titanium, and tin. Such metallic current collectors may optionally have a layer comprising conductive carbon or graphite coated on the metallic layer.

Methods of Making Composite Cathodes

One aspect of the present invention pertains to methods for fabricating solid composite cathodes, as described herein.

One method employs a physical mixture of an electroactive sulfur-containing cathode material, a cationic polymer comprising quaternary ammonium salt groups, and optionally non-cationic polymeric binders, conductive additives, electrolytes, non-electroactive metal oxides, and other additives, either as dry solids, or as a slurry in a solvent or mixture of solvents. The mixture is fabricated into a solid composite cathode structure of desired dimensions, for example, by casting, doctor blade coating, roll coating, dip coating, extrusion coating, calendering, and other means known in the art.

Mixing of the various components may be accomplished using any of a variety of methods so long as the desired dissolution or dispersion of the components is obtained. Suitable methods of mixing include, but are not limited to, mechanical agitation, grinding, ultrasonication, ball milling, sand milling, and impingement milling.

The formulated dispersions may be applied to supports by any of a variety of well-known coating methods and dried using conventional techniques. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Removal of some or all of the liquid from the mixture may be accomplished by any of a variety of conventional means. Examples of suitable methods for the removal of liquid from the mixture include, but are not limited to, hot air convection, heat, infrared radiation, flowing gases, vacuum, reduced pressure, extraction, and by simply air drying if convenient.

Once formed, the solid composite cathode may optionally be calendered to provide a solid composite cathode with a desired thickness, porosity, and volumetric density of electroactive material.

Thus, in one embodiment, the present invention pertains to a method for the preparation of a solid composite cathode, said method comprising the steps of:

(a) dispersing, suspending, or dissolving, in a liquid medium, an electroactive sulfur-containing material, as described herein, and a cationic polymer comprising quaternary ammonium salt groups, as described herein;

(b) casting the mixture formed in step (a) onto a substrate or placing the mixture formed in step (a) into a mold; and (c) removing some or all of the liquid medium from the mixture of step (b) to form a solid or gel-like composite cathode in the shape or form desired.

Examples of liquid media suitable for use in the methods of the present invention include, but are not limited to, aqueous liquids, non-aqueous liquids, and mixtures thereof. Preferred liquids are aqueous liquids and mixtures of water and non-aqueous liquids such as methanol, ethanol, and isopropanol.

Optionally, non-cationic polymeric binders, conductive additives, non-electroactive metal oxides, and other additives may be added to the mixture at one or more of the various steps in the methods, usually at steps which involve dissolving, dispersing, or mixing. Such additives often facilitate adhesion, cohesion, current collection, and ion transport.

FIG. 1 illustrates a solid composite cathode structure 1 in contact with a current collector 2 wherein the solid composite cathode was made by the method of dispersing the sulfur-containing cathode materials 3 in a liquid medium also comprising the cationic polymers of the present invention, and optionally non-cationic polymeric binders, conductive materials, and other additives as described herein, and coating and drying the medium, as described herein, to form a matrix of the sulfur-containing cathode materials 3 dispersed in a phase 4 comprising the cationic polymer comprising quaternary ammonium salt groups, and optionally other additives. The phase 4 retards the transport of soluble polysulfides from the solid composite cathode to the electrolyte or other layers or parts of the electric current producing cell.

Rechargeable Battery Cells and Methods of Making Same

One aspect of the present invention pertains to an electric current producing cell which comprises:

(a) an anode;

(b) a solid composite cathode, as described herein; and, (c) an electrolyte interposed between said anode and said cathode.

Another aspect of the present invention pertains to a method of forming an electric current producing cell, which method comprises the steps of:

(a) providing an anode;

(b) providing a solid composite cathode, as described herein; and, (c) enclosing an electrolyte between said anode and said cathode.

In one embodiment, the electric current producing cell is a secondary (rechargeable) electric current producing cell.

Suitable anode active materials for the electrochemical cells of the present invention include, but are not limited to, one or more metals or metal alloys or a mixture of one or more metals and one or more alloys, wherein said metals are selected from the Group IA and IIA metals in the Periodic Table. Examples of suitable anode active materials include, but are not limited to, alkali-metal intercalated conductive polymers, such as lithium doped polyacetylenes, polyphenylenes, polypyrroles, and the like, and alkali-metal intercalated graphites and carbons. Anode active materials comprising lithium are particularly useful for the anode of the cells of the present invention. Preferred anode materials are lithium metal, lithium-aluminum alloys, lithium-tin alloys, lithium-intercalated carbons, and lithium-intercalated graphites.

The electrolytes used in battery cells function as a medium for storage and transport of ions and, in the special case of solid electrolytes, these materials may additionally function as separator materials between the anode and the cathode. Any liquid, solid, or solid-like material capable of storing and transporting ions may be used, so long as the material is electrochemically and chemically inert with respect to the anode and the cathode, the material facilitates the transport of ions between the anode and the cathode, and the material is electronically non-conducting to prevent short-circuiting between the anode and the cathode.

Examples of suitable electrolytes for use in the present invention include, but are not limited to, organic electrolytes comprising one or more materials selected from the group consisting of: liquid electrolytes, gel polymer electrolytes, and solid polymer electrolytes.

Examples of useful liquid electrolyte solvents include, but are not limited to, N-methyl acetamide, acetonitrile, carbonates, sulfones, sulfolanes, glymes, siloxanes, dioxolanes, N-alkyl pyrrolidones, substituted forms of the foregoing, and blends thereof.

These liquid electrolyte solvents are themselves useful as gel forming (plasticizing) agents for gel-polymer electrolytes. Further examples of useful gel-polymer electrolytes include, but are not limited to, those comprising polymers selected from the group consisting of: polyethylene oxides (PEO), polypropylene oxides, polyacrylonitriles, polysiloxanes, polyimides, polyethers, sulfonated polyimides, perfluorinated membranes (Nafion™ resins), divinyl polyethylene glycols, polyethylene glycol-bis-(methyl acrylates), polyethylene glycol-bis-(methyl methacrylates), derivatives of the foregoing, copolymers of the foregoing, crosslinked and network structures of the foregoing, and blends of the foregoing; to which is added an appropriate ionic electrolyte salt.

Examples of useful solid polymer electrolytes include, but are not limited to, those comprising polymers selected from the group consisting of: polyethers, polyethylene oxides (PEO), polypropylene oxides, polyimides, polyphosphazenes, polyacrylonitriles (PAN), polysiloxanes, derivatives of the foregoing, copolymers of the foregoing, crosslinked and network structures of the foregoing, and blends of the foregoing; to which is added an appropriate ionic electrolyte salt. Ionically conductive solid polymer electrolytes may additionally function as separator materials between the anode and the cathode.

In addition to solvents, gelling agents, and ionically conductive polymers as known in the art for organic electrolytes, the organic electrolyte further comprises one or more ionic electrolyte salts, also as known in the art, to increase the ionic conductivity.

Examples of ionic electrolyte salts for use in the present invention include, but are not limited to, $MClO_4$, $MAsF_6$, $MSO_3CF_3$, $MSO_3CH_3$, $MBF_4$, $MB(Ph)_4$, $MPF_6$, $MC(SO_2CF_3)_3$, $MN(SO_2CF_3)_2$,

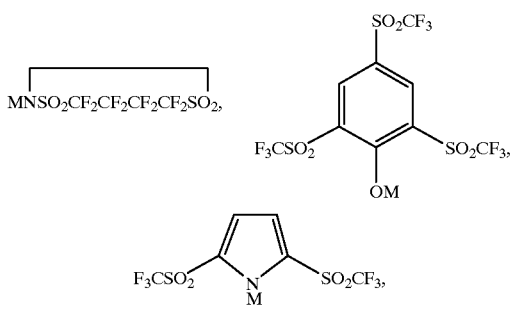

and the like, where M is Li or Na. Other electrolyte salts useful in the practice of this invention are disclosed in U.S. Pat. No. 5,538,812 to Lee et al. Preferred ionic electrolyte salts are $LiSO_3CF_3$ (lithium triflate) and $LiN(SO_2CF_3)_2$ (lithium imide).

EXAMPLES

Several embodiments of the present invention are described in the following examples, which are offered by way of illustration and not by way of limitation.

Example 1

Solid composite cathodes were fabricated using a cationic polymer comprising quaternary ammonium salt groups and a carbon-sulfur polymer as the cathode active material. The carbon-sulfur polymer was prepared as described in Example 2 of copending U.S. Pat. Application titled, "Electroactive, Energy-Storing, Highly-Crosslinked, Polysulfide-Containing Organic Polymers for Use in Electrochemical Cells," filed on even date herewith. The carbon-sulfur polymer was pre-ground to disperse any clumping of the polymer particles (mean particle size less than 10 microns). A cathode slurry with a formulation (dry weight basis) of 83% carbon-sulfur polymer, 10% PRINTEX XE-2 (a trade name for conductive carbon available from Degussa Corporation, Akron, Ohio), 2% PYROGRAF-III (a trade name for carbon nanofibers available from Applied Sciences, Inc., Cedarville, Ohio), 4% AMAC (poly (acrylamide-co-diallyldimethylammonium chloride (available from Aldrich Chemical Company, Milwaukee, Wis.)), and 1% polyethylene oxide (PEO, 5,000,000 molecular weight available from Polysciences Inc., Warrington, Pa.) with water as the solvent was prepared in a ball mill jar containing ceramic cylinders. The solid content of the slurry was 12 weight percent. The slurry mixture was ball milled for 20 hours. The resulting slurry was cast by hand draw with a gap coating bar onto both sides of a 17.5 micron thick conductive carbon coated aluminum foil (Product No. 60303 available from Rexam Graphics, South Hadley, Mass.) as a current collector. The coating was dried under ambient conditions overnight and then dried under vacuum at 60° C. for one hour. The resulting dry cathode coating had a thickness of about 22 microns on each side of the current collector, with a loading of electroactive cathode material of about 1.1 $mg/cm^2$. The volumetric density of the electroactive materials was about 485 $mg/cm^3$.

Figure 2:
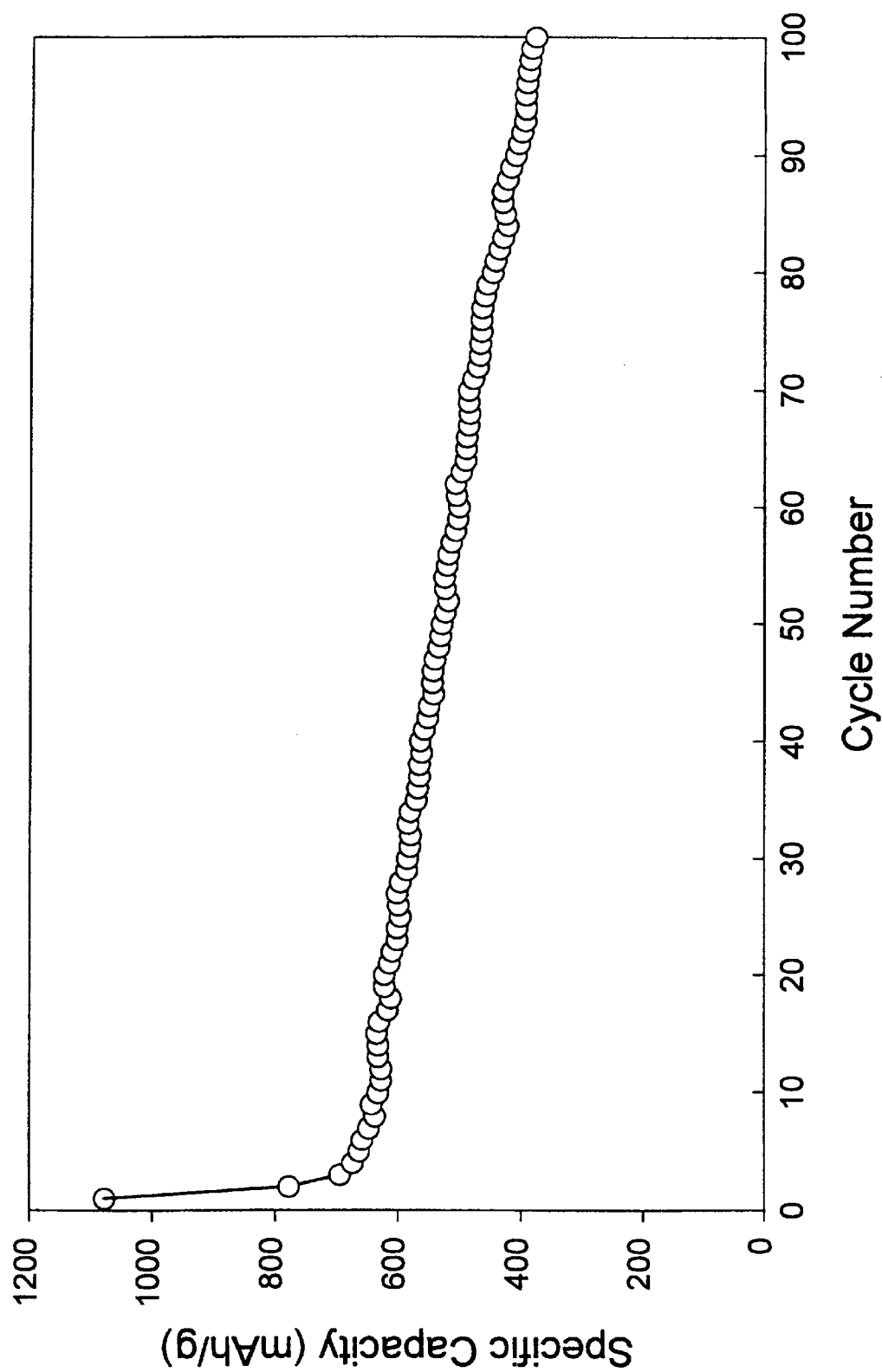
FIG. 2 shows the specific capacity verus cycle number for a AA cell comprising a carbon-sulfur electoactive material and a 4:1 by weight ratio binder consisting of poly (acrylamide-co-diallyldimethylammonium) choride and polyethylene oxide (PEO) binder.

Wound AA size cells were fabricated from these cathodes with a 50 micron thick lithium foil anode and a 25 micron thick E25 SETELA separator (a trade name for a polyolefin separator available from Tonen Chemical Corporation, Tokyo, Japan, and available from Mobil Chemical Company, Films Division, Pittsford, N.Y.). The cells were filled with a liquid electrolyte containing 1.0 M lithium imide (available from 3M Corporation, St. Paul, Minn.) in a 50:50 blend by volume of 1,3-dioxolane and dimethoxyethane (DME). The cells were cycled at a rate of charge and discharge of C/2 (0.35 $mA/cm^2$) and C/1.5 (0.49 $mA/cm^2$) respectively. Cell performance data, as illustrated in FIG. 2 for a typical cell, showed that these carbon-sulfur polymer cathodes had excellent capacity and stability under these cycling conditions.

After 100 cycles, cells were rested for 24 hours. When cycling was resumed, the cells were charged until a voltage limitation of 3.0 V was reached. This resulted in the capacity of the cell regaining its level as at the $63^{rd}$ discharge cycle.

Example 2

Solid composite cathodes comprising elemental sulfur as the cathode active material, and AMAC and PEO in a 1:1 weight ratio as the binder materials, were prepared by the following method. A cathode slurry with the formulation (dry weight basis) of 80% elemental sulfur (available from Aldrich Chemical Company, Milwaukee, WIS), 10% PRINTEX XE-2 carbon, 5% PYROGRAF-III carbon nanofibers, 2.5% AMAC cationic polymer, and 2.5% PEO non-cationic polymer (5,000,000 molecular weight) in an ethanol/water mixture (4:6 by volume) and at a solid content of 12 weight percent, was first premixed for 15 minutes in a laboratory Cowles mixer. This mixture was transferred to a 250 ml Eiger sand mill and milled for a residence time of 2.8 minutes. The slurry was coated and dried as in Example 1. The dry cathode coating had a thickness in the range of 20 to 25 microns on each side of the current collector, with a coating density of 1.3 $mg/cm^2$. The volumetric density of the electroactive cathode material was about 560 $mg/cm^3$.

Example 3

Figure 3:
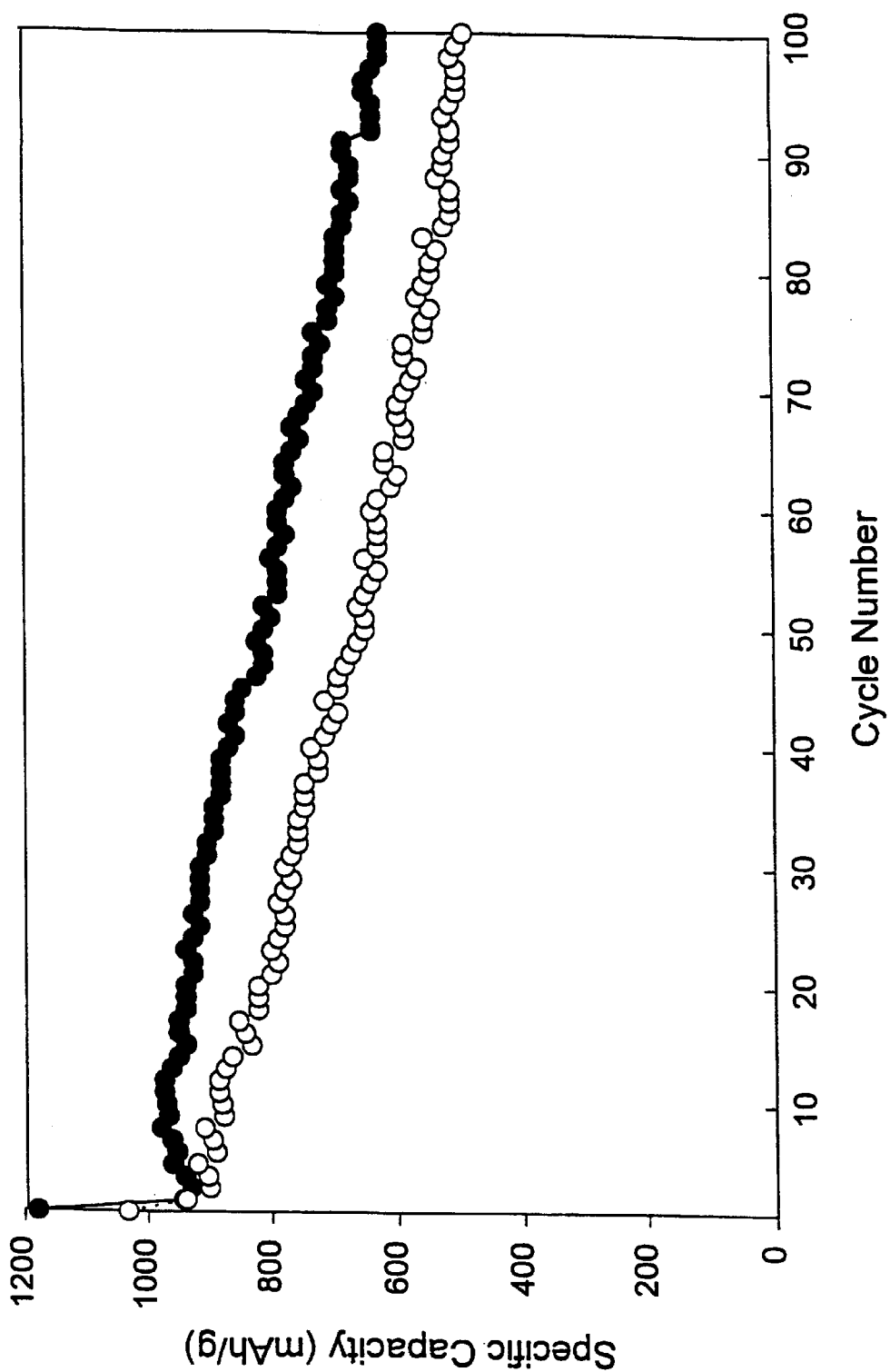
FIG. 3 shows the specific capacity versus cycle number for two AA cells with a composite cathode comprising a sulfur electroactive material and binder consisting of poly (acrylamide-co-diallyldimethylammonium) choride (AMAC) and polyethylene oxide (PEO) binder (open circles are AMAC:PEO 1:1 by weight; closed circles are AMAC:PEO 4:1 by weight).

Wound AA size cells were fabricated from cathodes prepared as described in Example 2 with a 75 micron thick lithium foil anode and a 25 micron thick E25 SETELA separator. Cells were filled with a liquid electrolyte containing 1.0 M lithium triflate (available from 3M Corporation, St. Paul, Minn.) in a 50:35:10:5 blend by volume of 1,3-dioxolane:diglyme:DME:o-xylene. The cells were cycled at a charge rate of 0.30 $mA/cm^2$ and a discharge rate of 0.33 $mA/cm^2$ for the first ten cycles, then under a GSM pulse discharge of equivalent to 0.33 $mA/cm^2$ average for all subsequent cycles. The specific capacity versus cycle number for one cell is shown by the open circles in FIG. 3. The cells showed average specific capacities of 880 mAh/g of elemental sulfur at the $10^{th}$ cycle, 650 mAh/g at the $50^{th}$ cycle, and 490 mAh/g at the $100^{th}$ cycle. The polarization of the pulse discharge curve was 20 mV.

Example 4

Solid composite cathodes with a AMAC/PEO binder blend in a 4:1 ratio by weight were prepared by the method described in Example 2, except that the weight percentages of AMAC and PEO were 4% and 1%, respectively. The resulting dry cathode coating had a thickness in the range of 20 to 25 microns on each side of the current collector and a density of about 1.2 $mg/cm^2$ of the electroactive material. The volumetric density of the electroactive cathode material was about 520 $mg/cm^3$.

Example 5

Wound AA size cells were fabricated from cathodes prepared as described in Example 4 using a 75 micron thick lithium foil anode and an E25 SETELA separator. The cells were filled and cycled as described in Example 3. The specific capacity versus cycle number for one cell is shown by the closed circles in FIG. 3. The cells showed average specific capacities of 970 mAh/g of elemental sulfur at the 10$^{th}$ cycle, 810 mAh/g at the 50$^{th}$ cycle, 630 mAh/g at the 100$^{th}$ cycle, and 320 mAh/g at the 200$^{th}$ cycle. The polarization of the pulse discharge curve was only 90 mV. In contrast, cells made as in Examples 2 and 3, except that 5% PEO was substituted for the blend of 2.5% AMAC and 2.5% PEO as the binder for these cells, showed average specific capacities at the 100$^{th}$ cycle of less than 400 mAh/g and had a polarization of the pluse discharge curve of over 200 mV. This illustrates the beneficial effect of the cationic AMAC binder on the electrochemical efficiency and cyclability of a sulfur-containing electric current producing cell.

While the invention has been described in detail and with reference to specific embodiments thereof, it will be apparent to one skilled in the art that various changes and modifications can be made without departing from the spirit and scope thereof

What is claimed is:

1. solid composite cathode for use in an electric current producing cell, said solid composite cathode comprising:
   (a) an electroactive sulfur-containing material which, in its oxidized state, comprises a polysulfide moiety of the formula, —S$_m$—, wherein m is an integer from 3 to 10; and,
   (b) a cationic polymer comprising quaternary ammonium salt groups;
wherein said quaternary ammonium salt groups of said cationic polymer comprise an anion, said anion comprising a reduction product of said electroactive sulfur-containing material.

2. The solid composite cathode of claim 1, wherein said cationic polymer comprising quaternary ammonium salt groups is selected from the group consisting of:
   poly(diallyldimethylammonium) salts,
   copolymer salts of diallyldimethylammonium and acrylamide,
   copolymer salts of diallyldimethylammonium and diacetone acrylamide,
   copolymer salts of diallyldimethylammonium and N-methylolacrylamide,
   polyvinyl benzyl trimethyl ammonium salts,
   salts of polyepichlorohydrin quaternized with trimethyl amine,
   poly(dimethyl propyl ammonium) salts,
   polymethacryloyloxyethyltrimethyl ammonium salts, and,
   polymethacryloyloxyethyl dimethyl hydroxyethyl ammonium salts.

3. The solid composite cathode of claim 1, wherein said cationic polymer comprising quaternary ammonium salt groups is a poly(diallyldimethyl ammonium) salt.

4. The solid composite cathode of claim 1, wherein said cationic polymer comprising quaternary ammonium salt groups is a copolymer salt of diallyldimethyl ammonium and acrylamide.

5. The solid composite cathode of claim 1, wherein said anion is selected from the group consisting of organic polysulfides of the formula (R'S$_x^-$) and inorganic polysulfides of the formula (S$_x^{2-}$), wherein x is equal or greater than 2 and R' is a carbon-sulfur moiety.

6. The solid composite cathode of claim 1, wherein said anion is a polysulfide dianion.

7. The solid composite cathode of claim 1, wherein said anion is an octasulfide dianion.

8. The solid composite cathode of claim 1, wherein said anion is a polysulfide polyanion comprising three or more anion groups.

9. The solid composite cathode of claim 1, wherein said electroactive sulfur-containing material comprises elemental sulfur.

10. The solid composite cathode of claim 1, wherein said electroactive sulfur-containing material comprises a carbon-sulfur polymer.

11. The solid composite cathode of claim 10, wherein m is an integer from 6 to 10.

12. The solid composite cathode of claim 10, wherein said polysulfide moiety, —S$_m$—, is covalently bonded by one or both of its terminal sulfur atoms on a side group to the polymer backbone chain of said carbon-sulfur polymer.

13. The solid composite cathode of claim 10, wherein said polysulfide moiety, —S$_m$—, is incorporated by covalent bonds to both of its terminal sulfur atoms into the polymer backbone chain of said carbon-sulfur polymer.

14. The solid composite cathode of claim 10, wherein said carbon-sulfur polymer comprises greater than 75 weight percent of sulfur.

15. The solid composite cathode of claim 1, wherein said composite cathode further comprises a non-cationic polymeric binder.

16. The solid composite cathode of claim 15, wherein said non-cationic polymeric binder comprises a non-cationic polymeric binder selected from the group consisting of polyethylene oxides, polypropylene oxides, polyethers, polyimides, polyphosphazenes, polyacrylonitriles, cellulosics, and urethanes.

17. The solid composite cathode of claim 15, wherein said non-cationic polymeric binder comprises polyethylene oxide.

18. The solid composite cathode of claim 15, wherein said non-cationic polymeric binder comprises hydroxyethyl cellulose.

19. The solid composite cathode of claim 15, wherein the weight ratio of said non-cationic polymeric binder to said cationic polymer is in the range of 0.25:1 to 1:1.

20. The solid composite cathode of claim 1, wherein said composite cathode further comprises one or more conductive fillers selected from the group consisting of conductive carbons, graphites, active carbon fibers, metal flakes, metal powders, metal fibers, electrically conductive polymers, and electrically conductive metal chalcogenides.

21. The solid composite cathode of claim 1, wherein said composite cathode further comprises an electrolyte.

22. The solid composite cathode of claim 1, wherein said composite cathode further comprises a non-electroactive metal oxide selected from the group consisting of silicas, aluminum oxides, silicates, and titanium oxides.

23. A method of forming a solid composite cathode, wherein said method comprises the steps of:
   (a) dispersing or dissolving, in a liquid medium, an electroactive sulfur-containing material which, in its oxidized state, comprises a polysulfide moiety of the formula, —S$_m$—, where m is an integer from 3 to 10, and a cationic polymer comprising quaternary ammonium salt groups;
      wherein said quaternary ammonium salt groups of said cationic polymer comprise an anion, said anion comprising a reduction product of said electroactive sulfur-containing material;
   (b) casting the composition resulting from step (a) onto a substrate or placing the composition resulting from step (a) into a mold; and
   (c) removing some or all of the liquid from the composition resulting from step (b) to provide a solid composite cathode in the shape or form desired.

* * * * *